(12) United States Patent
Rickard

(10) Patent No.: US 8,193,654 B2
(45) Date of Patent: Jun. 5, 2012

(54) VARIABLE SPEED POWER GENERATOR HAVING TWO INDUCTION GENERATORS ON A COMMON SHAFT

(75) Inventor: Justin Roald Rickard, Turramurra (AU)

(73) Assignee: Varispeed Electric Motors Pty Ltd, Smithfield (AU)

( * ) Notice: Subject to any disclaimer, the term of this patent is extended or adjusted under 35 U.S.C. 154(b) by 1124 days.

(21) Appl. No.: 11/667,084

(22) PCT Filed: Nov. 8, 2004

(86) PCT No.: PCT/AU2004/001538
§ 371 (c)(1),
(2), (4) Date: Jan. 15, 2009

(87) PCT Pub. No.: WO2005/046044
PCT Pub. Date: May 19, 2005

(65) Prior Publication Data
US 2009/0121482 A1    May 14, 2009

(30) Foreign Application Priority Data
Nov. 6, 2003    (AU) ................................ 2003906158

(51) Int. Cl.
*H02K 17/18*    (2006.01)
(52) U.S. Cl. .......................................... 290/44; 310/114
(58) Field of Classification Search ...................... 290/44
See application file for complete search history.

(56) References Cited

U.S. PATENT DOCUMENTS

| | | | | |
|---|---|---|---|---|
| 3,183,431 A | * | 5/1965 | Ford | 322/32 |
| 3,210,644 A | * | 10/1965 | Sparrow | 322/25 |
| 3,476,998 A | * | 11/1969 | Agarwal | 318/146 |
| 3,571,693 A | * | 3/1971 | Riaz | 322/32 |
| 3,659,129 A | * | 4/1972 | Pettersen | 310/216.017 |
| 3,975,646 A | * | 8/1976 | Kilgore et al. | 307/21 |
| 4,087,698 A | * | 5/1978 | Myers | 307/84 |
| 4,229,689 A | * | 10/1980 | Nickoladze | 322/32 |

(Continued)

FOREIGN PATENT DOCUMENTS

GB    2277205 A    * 10/1994

(Continued)

*Primary Examiner* — Joseph Waks
(74) *Attorney, Agent, or Firm* — Davidson Berquist Jackson & Gowdey, LLP

(57) ABSTRACT

A variable speed power generator system, includes a primary power induction generator (12), a secondary control induction (14), each of the induction generators having a rotor (22, 24) mounted so as to be rotated by a common shaft (16) of a variable speed prime mover (20), an inverter (50) connected to the stator (15) of the secondary control induction generator, a controller (30) connected to the inverter controls the output of the inverter, output of the primary induction generator is connected to the grid (51), controller provides output signal to the inverter based on selected inputs to the controller so that the output of the primary induction generator matches the active and reactive power requirements of the grid. An induction machine which includes a rotor having laminations and insulated cage bars, the bars being electrically isolated from on another as well as electrically insulated from the laminations.

16 Claims, 2 Drawing Sheets

U.S. PATENT DOCUMENTS

| | | | | |
|---|---|---|---|---|
| 4,246,531 A | * | 1/1981 | Jordan | 322/28 |
| 4,329,538 A | * | 5/1982 | Meyer | 174/119 R |
| 6,278,211 B1 | * | 8/2001 | Sweo | 310/114 |
| 6,784,634 B2 | * | 8/2004 | Sweo | 318/727 |
| 2003/0052643 A1 | * | 3/2003 | Sweo | 318/801 |
| 2005/0134137 A1 | * | 6/2005 | Sweo | 310/211 |
| 2006/0150396 A1 | * | 7/2006 | Sweo | 29/596 |
| 2008/0129050 A1 | * | 6/2008 | Guey et al. | 290/43 |

FOREIGN PATENT DOCUMENTS

| | | | |
|---|---|---|---|
| JP | 2001025222 A | * | 1/2001 |
| JP | 2001339976 A | * | 12/2001 |
| NL | 152719 B | * | 3/1977 |
| RU | 2152117 C1 | * | 6/2000 |

* cited by examiner

VARIABLE SPEED POWER GENERATOR HAVING TWO INDUCTION GENERATORS ON A COMMON SHAFT

FIELD OF THE INVENTION

The present invention relates generally to induction machines, in particular concerning power generation from variable speed inputs, such as for example those found in wind energy generation, hydroelectric power generation and tidal power generation. Although it will be convenient to hereinafter describe the invention with reference to wind turbine applications, it is to be understood that this is not to be taken as a limitation of the scope of the invention.

BACKGROUND TO THE INVENTION

Induction machines are well known; however for a long time it has been considered that synchronous machines were much better for generating alternating current, and the induction generator has been considered less commercially significant and its importance for power generation downplayed.

When variable speed energy sources are operating independently of other energy systems, electricity of reliable and usable frequency and current can be obtained effectively and cheaply by utilising relatively simple and low cost power electronic controls. However, when variable speed energy sources are to be integrated with large scale supplies and connected to large scale grids, sophisticated and expensive electronic controls are required. This is because power grids demand power input of a selected active and reactive power characteristic; that is, the voltage and current wave forms must be phase related in a selected manner to meet the requirements of the connected load.

To provide this integration when using conventional induction generators, and since singly fed induction generators are fundamentally incapable of supplying reactive power, such a generator must be doubly-fed—that is it must have a second full power input, usually and most commonly in the form of a pulse width modulated converter connected to its (wound) rotor circuit.

Such a doubly-fed machine requires brushes and sliprings. There are very significant maintenance costs and problems associated with brushes and sliprings for a generator which is located at the top of a high tower, where such a generator is usually located in order to generate maximum power from a large rotating wind-driven propeller or prime mover. (Another form of a doubly-fed machine which is not generally satisfactory in a power generation application has TWO stator windings which interact with each other and upon the conductors of a common rotor winding.) Induction generators are usually coupled to the prime mover by means of a full speed reduction gearbox, since such a generator does not require as many poles as one without a gearbox. However a full reduction gearbox adds a very significant mass to the system, which is undesirable in terms of cost and logistics when located at the top of a high tower.

Alternatively conventional synchronous generators may be used, however these are fundamentally constant speed devices and can only be used in wind applications if the output is rectified and then converted back to mains frequency. Whilst this eliminates the necessity for a gear box, the high cost of a full power (PWM) inverter makes conventional synchronous generators very expensive. Brushes and sliprings can only be avoided by using permanent magnet rotor excitation along with some other means to regulate or control the output voltage.

Brushless twin stator squirrel cage induction generators (BTSIG) are known as being suitable for generation in variable speed input situations, a particular version described by Edwin Sweo, wherein first and second generating machines are connected at their rotors by connecting the conductors in the first cage rotor to the conductors in the second cage rotor in a reverse phase sequence. This system introduces assembly and mechanical difficulties.

However, such a machine does not of itself constitute a substitute for other forms of variable speed generators, including the doubly-fed induction generator and the permanent magnet synchronous generator used in conjunction with a full power inverter referred to above.

The present invention seeks to alleviate one or more of the disadvantages of the generator arrangements referred to above.

SUMMARY OF THE INVENTION

According to one aspect of the present invention there is provided a machine suitable for generating power in a variable speed wind energy generation system, the machine including a primary or power induction generator, and a secondary or control induction generator, each induction generator having a rotor mounted so as to be rotated by a shaft common to both primary and secondary generators the rotors in each generator being of the squirrel-cage type, wherein cage bars of each rotor are electrically isolated from one another as well as being electrically isolated from laminations within the rotor; the secondary or control induction generator being adapted to be electrically connected to an inverter; the machine being adapted to be connected to a controller which provides an output signal to the inverter based on selected inputs to the controller such as active and reactive power output from the power generator so that in use the inverter may input a signal to the secondary or control induction generator to effect a selected output from the primary or power induction generator.

In use, the primary induction generator is electrically connected to a power grid for supply to the grid and the secondary or control induction generator is also electrically connected to the power grid for supply from the grid via an inverter, the inverter producing a controlled voltage and current of variable frequency and phase relationship.

In one preferred embodiment the machine includes primary and secondary induction generators, the generators having respective stators, the stators being magnetically and electrically isolated from each other, the generators further having respective rotors having windings insulated from adjacent windings and from their laminated structures and placed in a single common housing. The machine, hereinafter termed a brushless doubly-fed twin stator induction generator (BDFTSIG) can operate in a synchronous mode wherein a single frequency current passes through both sections of the common rotor.

Preferably, the rotor's cage bars are electrically connected to corresponding bars on the adjacent rotor. In one embodiment, this electrical insulation may be achieved either by employing pre-insulated bars or by lining the rotor slots with an insulated nomex or similar packet. The currents fed to the secondary stator control the reactive power flow in and from the primary stator in a brushless manner.

Advantages of preferred embodiments of the present invention are that the BDFTSIG is able to generate power at the power system's side at constant (power system) frequency notwithstanding variable rotor speeds, provided that the secondary induction generator is fed at an appropriate frequency so that synchronous generation is maintained. Therefore by adjusting frequency, phase and magnitude of the secondary or control induction generator stator current (excitation current) the amount of the active and reactive power (power factor control) flowing through the primary induction generator can be dynamically controlled. In operation, the inverter supplies the secondary or control induction generator and also is electrically connected to a control system so that the inverter provides voltage and current wave forms complementary to the primary induction generator's wave forms.

In a preferred embodiment the common shaft is operatively connected to a prime mover, in one form, a wind turbine.

In a preferred form, the stators of the primary and secondary generators are electrically isolated from each other, so that they do not interact in any electrical or magnetic manner.

Preferably, the controller receives signals, and processes the signals to output to an inverter. In one form, the controller includes at least one Proportional Integral (PI) controller; as well as one or more notch filters and phase angle synthesisers in order to provide inputs regarding voltage and current relationships to the inverter, without causing undue control spikes. In one embodiment the filters are adaptive notch filters to isolate the fundamental frequency of the voltage and current generated, since the mechanical input is generally variable.

According to another aspect of the present invention there is provided a variable input speed energy generation system, the system including primary and secondary induction generators, the generators being mounted on a common shaft, shared with a prime mover; a control system for controlling phase relationships between voltage and current produced by the system; and an inverter operatively connected to the controller for supplying the secondary induction generator with power at a selected voltage and current relationship, so that the energy output from the system substantially matches the specified active and reactive power requirements of the grid to which it is electrically connected.

Preferably each generator includes a respective separate stator winding, the generators further including a rotor mounted to the common shaft.

Preferably, the controller inputs are signals such as specified active and reactive power as well as signals from transducers.

Preferably a rotor position sensor is provided for determining the angular position of the common shaft and rotor. This may take any suitable form such as a transducer and in one preferred form the position sensor derives its outputs from a voltage signal output from the rotor. Other means may also be employed to detect the position of the common shaft 16, such as current detection.

Preferably active and reactive power transducers are also provided so as to determine the phase relationships between voltage and current at the output from the primary stator, and at the input to the secondary stator.

Preferably, voltage and current signals from the grid are obtained, filtered, to remove harmonics and then the Power System (Grid) References are calculated, for input to the controller. In one form the filtering is performed by adaptive notch filters.

In one embodiment the inverter is in the form of two PWM converters electrically connected; a first converter converting the AC input from the grid to DC. A second PWM converter converting the DC back to AC of a preferred frequency, however, with a phase relationship between the voltage and current which is complementary with that of the primary stator, in response to the inputs from the controller.

DESCRIPTION OF A PREFERRED EMBODIMENT

In order to enable a clearer understanding of the invention, drawings illustrating example embodiments are attached, and in those drawings.

Figure 1:
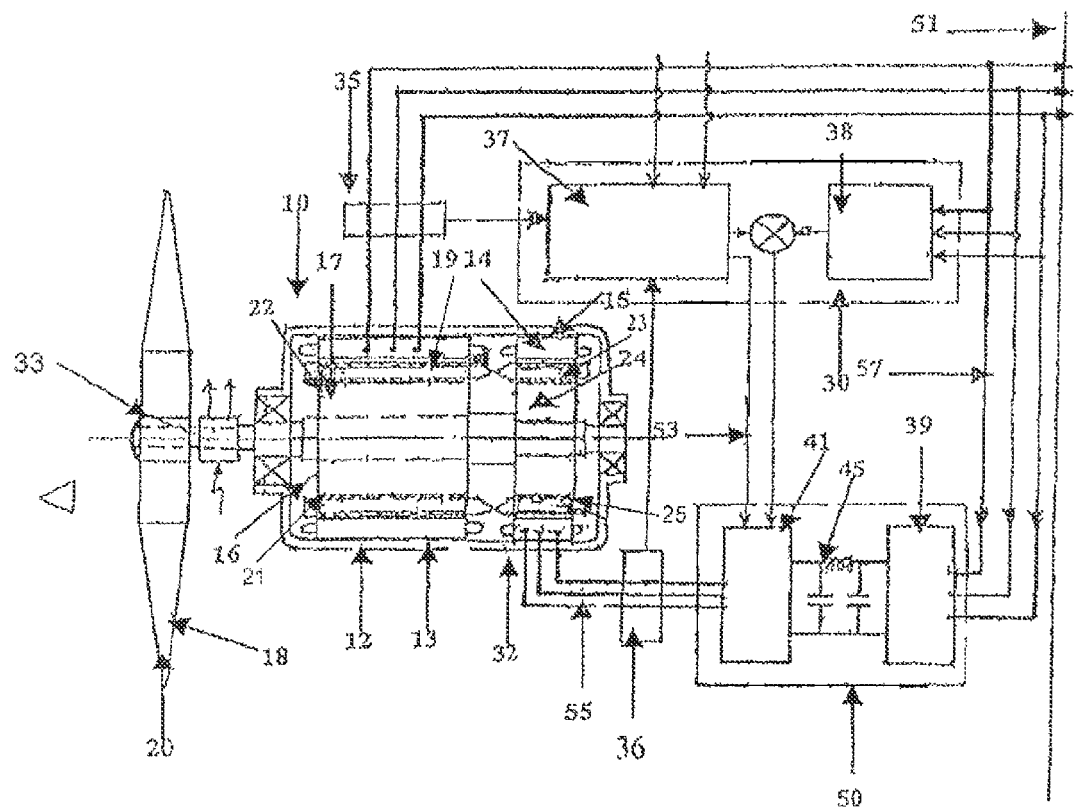
FIG. 1 is a basic connections diagram of the wind energy power generation system.

Referring to FIG. 1 there is shown a power generator generally indicated at 10 in the form of a primary induction generator 12 and a secondary or control induction generator 14 mounted on a common shaft 16 for rotation thereabout. A prime mover 18 in the form of a wind turbine 20 is also provided, mounted on the common shaft 16. The primary and secondary induction generators 12, 14 employ rotors 22, 24 of the squirrel cage type, having a laminated structure 17 as well as rotor bars 19, 23 and windings 21, 25. The bars 19, 23 of both rotors 22, 24 are insulated from the corresponding laminated structure 17. This electrical isolation is achieved in this embodiment either by employing pre-insulated bars or by lining the rotor slots with an insulated nomex or similar packet. Therefore, it is impossible to employ standard squirrel cage rotor manufacturing techniques such as die casting.

In this embodiment, the generator is known as a brushless doubly-fed twin stator induction generator (BDFTSIG), and includes the two induction generators 12, 14 magnetically and electrically insulated from one another with their rotors mounted on the common shaft 16, both generators placed in a single housing 32, the rotors 22, 24 having windings 21, 25 insulated from each other and from their laminated structures 17. Corresponding rotor bars 19, 23 are connected to one another between the rotors 22, 24 so that the rotors share a common current.

The primary generator 12 includes a stator winding 13, hereinafter termed the power winding 13, which is directly connected to a power grid 51. The secondary induction generator includes a stator winding 15, hereinafter termed the control winding 15 is supplied from a controlled voltage or current source of variable frequency via an inverter 50. The BDFTSIG can operate in a synchronous mode, wherein rotor current frequency in each induction generator 12, 14 is such that the power winding 13 currents or active and reactive power flow can be controlled through the rotors 22, 24 from the control winding 15 in a brushless manner.

Further indicated in FIG. 1 is a control system, generally indicated at 30. Part of the control system 30 is a rotary position transducer 33 which includes a small permanent magnet generator, (not shown), to indicate to the controller 30 the rotary position of the common shaft 16 and its speed at any time. The position of the common shaft 16 in relation to the phase of an inverter voltage vector is compared and a resulting signal is used to control the inverter 50 output.

The rotor bars 19, 23, although electrically insulated from adjacent rotor bars and laminated structures, within respective rotors, are electrically connected to rotor bars in adjacent rotors.

The primary stator 13 is electrically connected to a power grid 51. The secondary stator winding 15 is also electrically connected to the power grid 51, although it is an indirect connection via the inverter 50. The controller 30 also is electrically connected to the power grid 51 from which it accepts a phase oriented signal.

The controller 30 includes a maximum power controller 37 and a means 38 for computing a control angle. The means 38 is electrically connected to the grid 51. The maximum power controller 37 has inputs such from a transducer 35 measuring active and reactive power output from the primary stator 13 as well as a transducer 36 for measuring active and reactive power input to secondary stator The rotor position transducer 33 outputs to the means 38 for computing a control angle.

Figure 2:
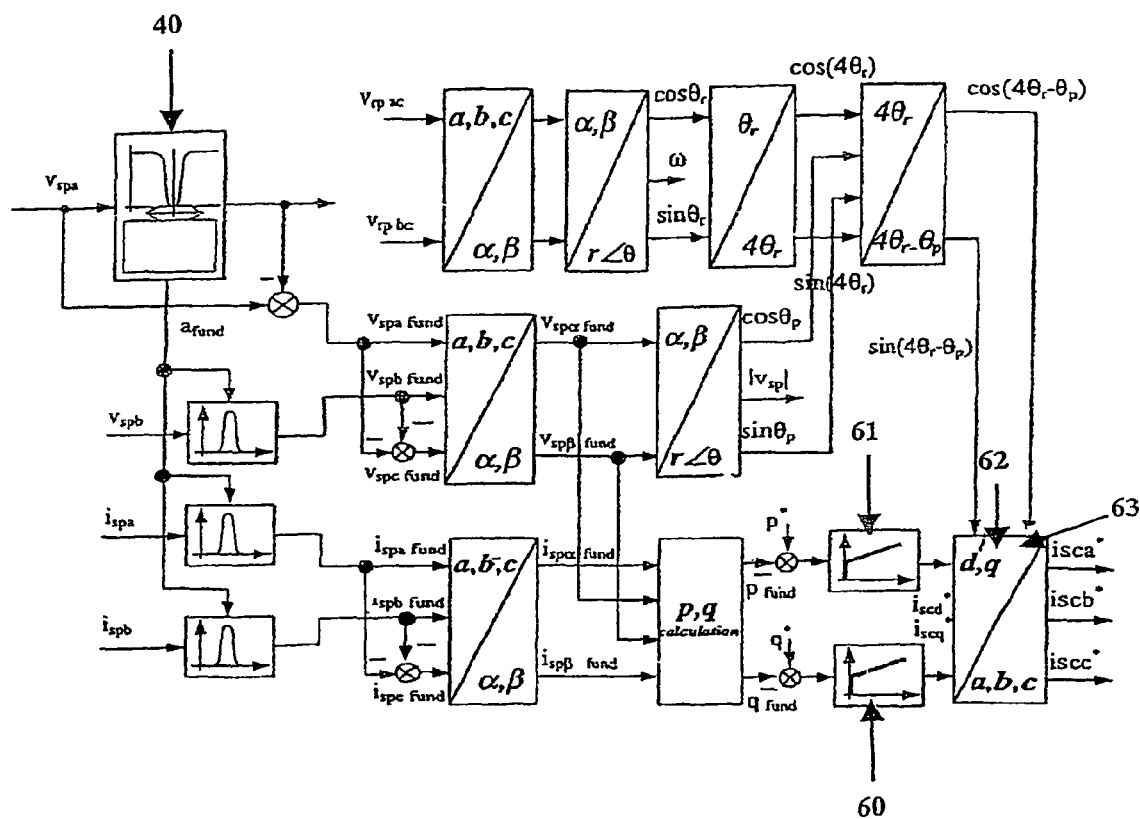
FIG. 2 is a block diagram of the control system associated with the generation system.

Referring to FIG. 2, there is shown a block diagram which displays the interaction of the elements of the control system and derivation of its inputs and the output produced in response to those inputs.

In operation, the major task of the BDFTSIG control system 30 is to suitably control the excitation current to the control windings according to a selected control strategy. In the control strategy of the preferred embodiment the excitation current to the control windings 15 is used to control the power/current components of the primary induction generator 12. This can be effected if the excitation current to the secondary induction generator 14 is of a proper frequency and phase angle and injected into the secondary induction generator 12 (control winding) so that the desired power output at the primary induction generator stator 13 terminals is achieved. This is achieved by using two proportional integral (P) controllers 60, 61 placed in the rotor co-ordinates which separately control primary induction machine 13 winding active and reactive power (current) components. A d channel 62 is used for the active power control as this is initially aligned with the power system voltage vector while an orthogonal q channel 63 is used for the reactive power control. Synchronous operation is maintained by using the rotor position feedback signal from the rotary position transducer 33 and information about the power system voltage position. From this information the required phase angle of the control current is determined by the controller 30.

Adaptive filtering is performed so that voltage and current wave forms are not distorted. Notch filters are provided, indicated at 40, which are centered at the fundamental frequency by using an adaptive tracking filter so that the corresponding fundamental components are extracted without any phase and amplitude distortions.

The inverter is shown at 50. This inverter supplies excitation power to the secondary induction machine windings, the phase and voltage and frequency of this power being in response to the signal is derived from the control system 30. The inverter 50 includes a first converter 39 and a second converter 41 electrically connected together via a DC bus. The first converter 39 is electrically connected to the power grid 51 via 57 and converts the signal to DC. In response to the DC from the first inverter 39 and the controller output 53, the second converter 41 produces AC power at 55 with a complementary frequency and phase relationship between voltage and current, to that in the primary stator windings 13.

A simple control strategy for the excitation current control is used, based on a current controlled PWM inverter, and two PI controllers 60, 61 placed in the synchronous co-ordinates, each PT controller separately controlling the active and reactive power flows through the power machine.

In operation, a preferred embodiment of the present invention has two separate stators 13, 15 which share a common rotor winding 21, 25. The inverter 50, whose output feeds the control stator 15, modulates the common rotor current 22, 24 via an air gap flux of the control machine 14. The rotor current in turn modulates and augments the output current produced by the power stator 13 through the air gap flux of the power machine 12. The two stator windings do not share a common iron circuit and there are fewer limitations on output from this interaction and the windings of both the power and control stators are relatively straightforward and inexpensive to construct.

Preferred embodiments of the present invention are designed to enable the grid-connection of renewable energy powered generators by combining a version of a doubly-fed induction generator (DFIG) which has twin stators and is brushless (BDFTSIG) 10 with an electronic inverter 50 and a regulator/control system 30 which is configured to produce the active (P) and reactive (Q) power demands required by the load of the grid 51 to which it is connected. These three elements in preferred embodiments (BDFTSIG) 10, inverter 50 and regulator/control system 30 are employed to achieve a selected power output having a selected frequency and phase relationship.

Preferred embodiments employ rotor windings 21, 25 which are insulated from their core iron circuit, even if they are of squirrel cage construction.

In preferred embodiments of the present invention, the power stator 13 is connected to the grid 51 and the second stator 15 (control stator) is connected to an electronic inverter 50. The inverter 50 provides a variable frequency supply under the control of the controller 30 via its inputs rotor position transducer 32, active and reactive power transducer 36 and the like. The control and power stators are coupled electro-magnetically through the twin airgaps between the rotor of the control machine 24 and the rotor of the power machine 22. A common rotor with interconnected windings is of the squirrel cage type (used for low-speed multipole applications in which the generator is direct-coupled to its prime mover). Because of the air link between the two stators, the normal voltage-current constraints between linked stators and rotors do not apply. Also, the voltage and current ratings (but not the voltage×current rating) of the variable frequency power fed from the inverter to the Control stator can be chosen to minimise the cost of the power electronics by selecting the lowest cost components. This represents a major cost saving compared to other inverter power supplies where the voltage and current is predicated by the voltage of the main stator windings.

Advantages of preferred embodiments of this system are as follows:

(i) The system is able to accept variable input energy, (which is characteristic of renewable energy sources such as wind, wave and ocean currents) and to efficiently convert the majority of the available energy, at any time, to useable fixed frequency output power suitable for supply to a 50 HZ or 60 HZ electricity grid.

It is able to do this because of (a) the high efficiency of the twin stator squirrel cage induction generator which results from the insulation of the rotor bars 19, 21 of both the Control and Power generators (b) the position sensing of the rotor and the use of this information to control the output of the electronic inverter which provides power to the control and (c) the circuitry of the inverter which provides output power at any leading or lagging power factor and frequency, so that the combined output of the Power and Control stators is available to the fixed frequency grid at any leading or lagging power factor demanded by the load on the grid.

The rating of the Inverter and the Control Stator, for normal reactive power requirements, need only be about 2-5 to 30% of the rating of the Power Stator.

(ii) The generator has no brushes or sliprings. Brushes and sliprings require regular replacement and generate carbon dust that adversely affects the life of the electrical windings. This is a very serious limitation in situations, such as high wind towers, where access is difficult especially if near the sea, where salt contamination combined with carbon dust, gives rise to further electrical operational problems. The use of brushes and sliprings, such as are used on other doubly-fed machines, is avoided by using entirely independent air gaps as the magnetic links between the two feeds to the generator.

(iii) Because the Power and Control stator windings are totally magnetically and electrically separated from each other, they do not interact on each other in any way and the voltage and current combination chosen for the inverter feed to the Control Stator is not constrained by the voltage chosen (for other economic or technical reasons) for the output windings of the Power Stator. This means that the voltage and current combination chosen for the inverter can be based on other considerations, such as minimum cost semiconductor devices.

(iv) The efficiency of the present Generator Generation System, since both stators contribute to the output power of the generator, is comparable with the efficiency of any other single winding Induction Generator of the same total KVA capacity.

(v) The present or "Varispeed" Generation System can be employed in two modes. In the high speed mode the two stators (Power and Control) are wound with a small number of poles (typically 4, 6 or 8) and the rotor windings are pitched correspondingly, and the generator shaft is coupled to the prime mover via an appropriate ratio step-up gearbox so that the speed of rotation of the rotor (in RPM, $n_r$) is related to the number of poles by the relationship $$n_r = \frac{(fc + fp) \times 60}{(Pc + Pp)}$$

where
fc=frequency of inverter output (HZ) feeding the Control Stator
fp=frequency of mains or grid
Pc=number of pole pairs in the Control Stator winding
Pp=number of pole pairs in the Power Stator winding
For 4 pole windings on the two stators this corresponds to a base rotor speed of about 900 RPM.

In the low speed mode, for which the present or "Varispeed" Generation System is equally applicable, the Generator Power and Control Stators are wound with a large number of poles (typically 210) and the Generator is direct coupled to the prime mover without the use of an intermediate step-up gearbox.

From the application of this formula it can be seen that the BDFTSIG generator has another advantage over both a conventional induction generator and a direct drive multi-pole synchronous generator when used in this situation. In the former case, the base speed of generator rotation is only 900 RPM for a BDFTSIG generator compared with 150 ORPM for a conventional 4 pole single stator induction generator and in the latter case with an input or prime mover speed of say 20 RPM, a conventional direct-coupled multi-pole synchronous generator would require 300 poles in order to generate 50 HZ at that speed whereas a direct-coupled BDFTSIG generator would only require about 210 poles.

In either mode of operation, the present or "Varispeed" BDFTSIG generator offers very considerable cost savings—either in a lower gearbox ratio and reduced gearbox weight or in a lower number of generator poles and a smaller generator diameter and weight.

The reference to any prior art in this specification is not, and should not be taken as, an acknowledgment or any form of suggestion that that prior art forms part of the common general knowledge in Australia.

Finally, it is to be understood that various alterations, modifications and/or additions may be incorporated into the various constructions and arrangements of parts without departing from the spirit or ambit of the invention.

I claim:

1. A machine suitable for generating power in a variable speed wind energy generation system, the machine including: a primary induction generator having a primary rotor, and a secondary induction generator having a secondary rotor, the primary rotor and the secondary rotor being mounted so as to be rotated by a shaft common to both the primary induction generator and the secondary induction generator, wherein each of the primary rotor and the secondary rotor comprise an insulated squirrel-cage design including a plurality of cage bars positioned around a laminated core wherein each of the cage bars of the primary rotor are electrically isolated from the laminated core as well as from adjacent cage bars within the primary rotor; and wherein each of the cage bars of the secondary rotor are electrically isolated from the laminated core as well as from adjacent cage bars within the secondary rotor;

wherein each one of the cage bars of the primary rotor is electrically connected to a corresponding one of the cage bars of the secondary rotor forming an electrical connection between the primary induction generator and the secondary induction generator;

wherein the machine further includes a controller and an inverter operatively connected to the controller, the inverter is operatively connected to the secondary induction generator for supplying the secondary induction generator with power, the controller being able to control the supply of the power from the inverter to the secondary induction generator to effect the output from the primary induction generator.

2. The machine in accordance with claim 1 wherein in use, the primary induction generator is electrically connected to a power grid for supply to the grid and the secondary or control induction generator is also electrically connected to the power grid for supply from the grid via the inverter, the inverter producing a controlled voltage and current of variable frequency and phase relationship.

3. The machine in accordance with claim 1 wherein the primary and secondary generators include respective stators, the stators being magnetically and electrically isolated from each other, so that they do not interact with each other in an electrical or magnetic manner, apart from via air gaps between them and their respective portions of the primary and secondary rotors.

4. The machine in accordance with claim 1 wherein the primary induction generator and secondary induction generator are placed in a single common housing so that they share a common current.

5. The machine in accordance with claim 1 wherein the machine can operate in a synchronous mode in which a single frequency current passes through both the primary and secondary rotors.

6. The machine in accordance with claim 1 wherein insulation of the cage bars is achieved by employing pre-insulated cage bars or by lining slots of the laminated core with an insulator packet.

7. The machine in accordance with claim 1 wherein in operation, the inverter supplies the secondary induction generator and also is electrically connected to the controller so that the inverter provides voltage and current wave forms complementary to the primary induction generator's wave forms.

8. The machine in accordance with claim 1 wherein the common shaft is operatively connected to a prime mover, in the form of, a wind turbine.

9. The machine in accordance with claim 1 wherein the controller includes at least one Proportional Integral (PI) controller; as well as one or more notch filters and phase angle synthesizers in order to provide inputs regarding voltage and current relationships to the inverter, without causing undue control spikes.

10. The machine in accordance with previous claim 1 wherein the filters are adaptive notch filters to isolate the fundamental frequency of the voltage and current generated.

11. A variable-input-speed energy generation apparatus, the apparatus including primary and secondary induction generators, the primary and secondary generators being mounted on a common shaft, the common shaft having a prime mover located at one end;
   wherein the primary induction generator includes primary stator and a primary rotor and the secondary induction generator includes a secondary stator and a secondary rotor, the primary and secondary rotors are mounted so as to be rotated by the common shaft, the primary and secondary rotors being of the squirrel-cage type including a plurality of cage bars radially spaced around a laminated core;
   wherein each of the cage bars of the primary rotor are electrically isolated from the laminated core as well as from adjacent cage bars within the primary rotor and each of the cage bars of the secondary rotor are electrically isolated from the laminated core as well as from adjacent cage bars within the secondary rotor;
   wherein each of the cage bars of the primary rotor is electrically connected to a corresponding one of the cage bars of the secondary rotor, forming an electrical connection between the primary induction generator and the secondary induction generator, and
   wherein the apparatus further includes a controller for controlling phase relationships between voltage and current produced by the apparatus; and an inverter operatively connected to the controller for supplying the secondary induction generator with power at a selected voltage and current relationship, so that the energy output from the apparatus substantially matches the specified active and reactive power requirements of the grid to which it is electrically connected.

12. The energy generation apparatus in accordance with claim 11 wherein each of the primary and secondary stators includes a respective separate stator winding.

13. The energy generation apparatus in accordance with claim 11 wherein the controller includes input from a transducer which measures the active and reactive power of at least one of the primary and secondary generators.

14. The energy generation apparatus in accordance with claim 11 wherein a rotor position sensor is provided for determining the angular position of the common shaft and at least on of the primary and secondary rotors, and for input to the controller.

15. The energy generation apparatus in accordance with claim 11 wherein active and reactive power transducers are also provided so as to determine the phase relationships between voltage and current at the output from the primary stator, and at the input to the secondary stator.

16. The energy generation apparatus in accordance with claim 11 wherein the inverter is in the form of two Pulse Width Modulation (PWM) converters electrically connected; a first converter converting the AC input from the grid to DC, and a second PWM converter converting the DC back to AC of a preferred frequency with a phase relationship between the voltage and current which is complementary with that of the primary stator, in response to the inputs from the controller.

\* \* \* \* \*